United States Patent
Herlocker et al.

(10) Patent No.: US 7,565,340 B2
(45) Date of Patent: Jul. 21, 2009

(54) METHODS FOR ASSISTING COMPUTER USERS PERFORMING MULTIPLE TASKS

(75) Inventors: Jonathan L. Herlocker, Philomath, OR (US); Thomas G. Dietterich, Corvallis, OR (US)

(73) Assignee: The State of Oregon Acting by and through the State Board of Higher Education on Behalf of Oregon State University, Corvallis, OR (US)

( * ) Notice: Subject to any disclaimer, the term of this patent is extended or adjusted under 35 U.S.C. 154(b) by 308 days.

(21) Appl. No.: 11/443,503

(22) Filed: May 30, 2006

(65) Prior Publication Data

US 2007/0162907 A1    Jul. 12, 2007

Related U.S. Application Data

(60) Provisional application No. 60/757,596, filed on Jan. 9, 2006.

(51) Int. Cl.
  G06F 9/44    (2006.01)
  G06N 7/02    (2006.01)
  G06N 7/06    (2006.01)

(52) U.S. Cl. ...................................................... 706/52

(58) Field of Classification Search .................... None
  See application file for complete search history.

(56) References Cited

U.S. PATENT DOCUMENTS

| | | | | |
|---|---|---|---|---|
| 4,648,031 A * | 3/1987 | Jenner | ........................ | 714/10 |
| 5,431,691 A * | 7/1995 | Snell et al. | .................... | 607/27 |
| 5,491,792 A * | 2/1996 | Grisham et al. | ............... | 714/39 |
| 6,005,482 A * | 12/1999 | Moran et al. | ............ | 340/568.8 |
| 6,326,946 B1 * | 12/2001 | Moran et al. | ................ | 345/156 |
| 6,774,786 B1 * | 8/2004 | Havekost et al. | ............ | 340/517 |
| 7,113,085 B2 * | 9/2006 | Havekost | .................... | 340/506 |
| 7,130,703 B2 * | 10/2006 | Ott et al. | ....................... | 700/80 |
| 7,250,856 B2 * | 7/2007 | Havekost et al. | ............ | 340/517 |

(Continued)

OTHER PUBLICATIONS

A Wireless Sensor Network Target Tracking System with Distributed Competition based Sensor Scheduling Yue Khing Toh; Wendong Xiao; Lihua Xie; Intelligent Sensors, Sensor Networks and Information, 2007. ISSNIP 2007. 3rd International Conference on Dec. 3-6, 2007 pp. 257-262 Digital Object Identifier 10.1109/ISSNIP.2007.4496853.*

(Continued)

*Primary Examiner*—Michael B Holmes
(74) *Attorney, Agent, or Firm*—Lumen Patent Firm

(57) ABSTRACT

A method for assisting multi-tasking computer users includes receiving from a user a specification of a task being performed by the user or an indication of completion of a task, collecting state changes in multiple executing programs, predicting a current task being performed by the user based on a recent state change event, a past specification of a task being performed by the user, and past events and associated tasks. Based on the predicted current task, user interface elements in multiple executing programs are adapted to facilitate performance of the task. The method may also allow a user to specify a new task based on a task template derived from a completed task to facilitate completion of the new task. The task templates also may be shared among users, and active tasks may also be team tasks shared among users.

42 Claims, 11 Drawing Sheets

U.S. PATENT DOCUMENTS

| | | | |
|---|---|---|---|
| 2003/0130995 A1 | 7/2003 | Pope et al. | 707/3 |
| 2003/0131013 A1 | 7/2003 | Pope et al. | 707/100 |
| 2003/0131016 A1* | 7/2003 | Tanny et al. | 707/102 |
| 2003/0158855 A1 | 8/2003 | Farnham et al. | 707/102 |
| 2004/0153436 A1 | 8/2004 | Pope et al. | 707/1 |
| 2004/0249821 A1 | 12/2004 | Nies et al. | 707/100 |

OTHER PUBLICATIONS

Kaminka, Gal A. et al. "Infrastructure for Tracking Users in Open Collaborative Applications: A Preliminary Report." The Maverick Group, Computer Science Dept., Bar Ilan University, Israel.

Fenstermacher, Kurt D. et al. "A Lightweight Framework for Cross-Application User Monitoring" (2002). IEEE Computer Society, pp. 51-pp. 59.

Kaptelinin, Victor. "UMEA: Translating Interaction Histories into Project Contexts" (2003). Paper: Integrating Tools and Tasks. vol. 5, Issue 1, pp. 353-pp. 360.

Voida, Stephen et al. "Integrating Virtual and Physical Context to Support Knowledge Workers" (2002). IEEE Pervasive Computing. vol. 1, No. 3.

* cited by examiner

METHODS FOR ASSISTING COMPUTER USERS PERFORMING MULTIPLE TASKS

CROSS-REFERENCE TO RELATED APPLICATIONS

This application claims priority from U.S. provisional patent application No. 60/757596 filed Jan. 9, 2006, which is incorporated herein by reference.

STATEMENT OF GOVERNMENT SPONSORED SUPPORT

This invention was supported in part by the National Science Foundation under contract/grant number IIS-133994 and DARPA grant no. HR0011-04-1-0005 and DARPA contract no. NBCHD030010. The U.S. Government has certain rights to the invention.

FIELD OF THE INVENTION

The present invention relates generally to techniques for assisting and improving the productivity of computer users. More specifically, it relates to computer-implemented methods for assisting users who switch between multiple tasks in a computing environment.

BACKGROUND OF THE INVENTION

The desktop computer has become the primary tool for knowledge workers in many professions, providing application programs for data management and analysis, scheduling, communications, word processing, accounting, and technical drawing, to name just a few. Multi-tasking knowledge workers often find themselves frequently switching between different tasks on the same computer. Due to the different sets of documents and other resources associated with distinct tasks, considerable time is consumed by task switching.

Although many attempts have been made to assist computer users with their computing activities, the existing approaches typically suffer from one or more disadvantages. For example, some approaches require time-consuming user interaction every time the user switches tasks. At the opposite extreme are techniques that require no user interaction but provide assistance that is of limited relevance. An example of systems that provide assistance of limited relevance is the class of systems that automatically cluster user data in an unsupervised manner—leading to organizations that are logical, but not compatible with the way that the user thinks about their information. Another disadvantage of many approaches is that they are limited to the adaptation of a single application program and do not provide multi-application integration. Another disadvantage of many approaches is that they do not take into consideration the user's past activity, e.g., desktop search systems that index all files on a user's desktop, even the ones that the user has never accessed before. Clearly, it would be desirable to provide sophisticated and relevant assistance to users in a computing environment to facilitate switching between multiple tasks involving multiple applications.

SUMMARY OF THE INVENTION

In one aspect of the invention, a computer-implemented method is provided for assisting a user performing multiple tasks in a computing environment. The method includes collecting from multiple executing programs event records that represent state changes in the programs. The event records may be collected, for example, by monitoring state changes in the multiple programs, selecting a subset of the monitored state changes, and generating event records representing the selected subset. The state changes in the programs may result from user interaction, automated processes, network communications, or other interactions between the programs and the computing environment. User interaction, for example, may include various forms of input received from the user, either locally or remotely, such as input resulting from user interaction with various programs or direct user feedback, e.g., correcting predicted associations between tasks and resources. The method also includes receiving from the user a specification of a task being performed by the user, e.g., when a user switches tasks and elects to explicitly specify the task. The user may also specify metadata associated with the task, e.g., information about relationships between tasks or an indication of completion of a task.

Also included in the method is predicting a current task being performed by the user, e.g., using machine learning to predict a most probable current task from stored evidence such as past associations between events and tasks. The current task may be predicted based on evidence including: i) a most recent event record, ii) a most recent specification received from the user of a task being performed by the user, and iii) past event records and associated task identifiers stored in a database. Other evidence may also be included such as time since the user last specified a task, past indications of completed tasks, tasks or keywords associated with resources related to the latest event, and explicit associations by the user between tasks and resources. Based on the predicted current task, user interface elements in multiple executing programs are automatically adapted to facilitate performing the current task. For example, the adaptation may include displaying a resource list (such as folders or directories) that contains resources associated with the predicted current task or that contains a menu of recently used resources filtered to favor resources associated with the predicted current task. The adaptation may also include displaying the predicted current task, e.g., in a menu bar of a window.

In some instances, the method may display a data-flow view of a task selected by the user. Such a data-flow view shows representations of resources associated with the selected task (e.g., a collection of icons) and representations of movement of data between the resources (e.g., a collection of lines connecting the icons). The method may also allow a user to specify a new task based on a task template derived from a completed task such that resources associated with the completed task are associated with the new task. In addition to allowing the same user to benefit from his or her own task templates, the templates also may be imported from other users or exported to other users. Tasks may also be team tasks shared among users, and the past event records used for prediction and adaptation may include event records associated with multiple users. The method may also allow control of a shared task to be assigned to a single user.

When the user indicates that they have changed task or the method predicts' that the user has changed task, the method may restore applications and resources to the state they were in when the user last worked on that task. The method may re-open the applications and resources that were open when the task was last worked on, it may navigate to the subparts of those resources that were most recently viewed or manipulated while working on the current project, and it may set the display features of the user interface windows (e.g., size and/or position) to be the same as when the application was last open on the current task. It may also hide or close applications, windows, and resources that were not open or active when the user last worked on the current task.

DETAILED DESCRIPTION

Figure 1A:
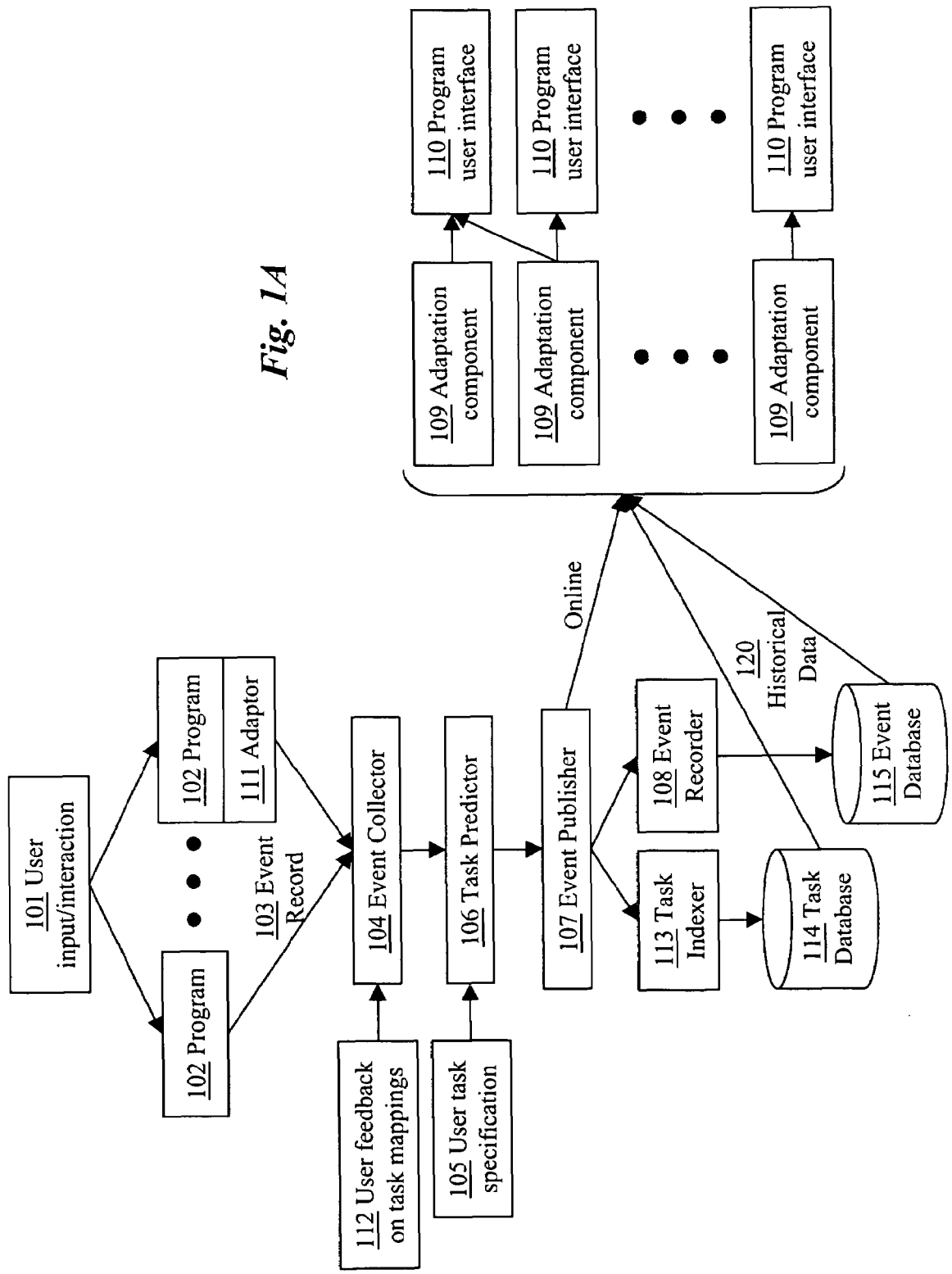
FIG. 1A shows a component-oriented view of an embodiment of the invention.

Although the present invention may be implemented in various computer systems running any of several operating systems and application programs, the following description may make reference to specific software applications, operating systems, and tasks for the purposes of illustration. Those skilled in the art will recognize that the present invention is not limited to these particularities.

Definitions

The following definitions will be used in the context of the present description:

Task. A task is a unit of work meaningful to an individual that involves some interaction with software applications on a computer. A task can be a compound activity extended over time and may be performed in a discontinuous manner. Sometimes a task can be performed contiguously in time without any interruptions, but often tasks are discontinuous over time, with interruptions involving switches to other tasks. Thus multiple tasks are often interleaved over time. Tasks may have a hierarchical structure so that a given task may have various sub-tasks. Embodiments of the invention allow the user to specify one task as the active task being performed at a given instant in time. However, embodiments may nonetheless predict that multiple tasks are active or that the task specified may be a non-leaf node in a hierarchy of tasks.

Event. Events are changes in state in executing software programs that are relevant to progress on a task. The most common events are caused by user interaction with the computer (involving an I/O device, a driver for the device, other routines that serve as intermediaries between the user and the software application itself.) Examples of such events are opening a file, saving a file, copying text to the clipboard, navigating to a web page, switching the currently focused window, and composing an email. Lower level events can also be collected, but in many cases they may be less useful. Such lower level events include mouse clicks and key presses. Events may occur in response to user-related input other than user interaction. Examples of this kind of event are email arriving into the user's inbox, incoming instant messages, and incoming phone calls. Such events are task related, but are not directly initiated by the user. Events may also come from automated processes such as an automated email that is sent every week or a calendar appointment reminder.

Resources. Resources include logically grouped collections of stored information. Common examples of resources include documents, folders, web pages, email messages and saved search queries. Resources also include named entities or processes that the user can send information to or receive information from via the computer interface. Examples include people (contacts) and mailing lists. Resources may also just be applications. Examples may include calendaring software applications, workflow applications, and financial tracking applications where knowledge of sub-collections of information within those applications is not made available to the invention (e.g., the instrumentation of the financial application may only be able to generate events when the application is accessed).

Evidence. Any data that can provide information (from an information theory perspective) or insight into which task an event is associated with can be considered as evidence as to what task the event is associated with. We also call these data features. Features may be raw data that is observed, or they might be data that result from applying some computation to raw features. Examples of features include: the last task manually specified (including when the user corrects or confirms a predicted task), time since that task was specified, the file name or title of the document displayed in the window that is currently in focus, the frequency of each word occurring in the document displayed in the window that is currently in focus, recipients of the email message that is currently being read or composed (if appropriate), etc.

Belief of the System. Embodiments of invention maintain beliefs about what the user's current task is and about what events are affiliated with what tasks. The system's belief of the current task is preferably computed using machine learning. Among other things, one of the inputs to the machine learning is the last task that the user explicitly specified. This can be combined with other relevant features, such as the time since the last task was specified by the user, the content in the window that is currently in focus, or the recipients of the email message being composed (if appropriate) in order to generate a prediction of the current task. The system maintains a database of its belief regarding what resources are affiliated with which tasks. It may also maintain a database recording its belief about what events are associated with what tasks. These beliefs may be modified by the user directly; for example, the user may specify that a certain resource doesn't belong in task A but should belong to task B. The beliefs may also be automatically modified by the system in response to some event; for example if the system observes the user accessing the file spreadsheet.xls immediately after explicitly specifying that the user is working on task B, then the system may update its belief so that spreadsheet.xls is associated with task B.

Metadata. Metadata about a task are data that describe the task. For example, metadata about a task include the name of the task. Metadata may also include information such as task deadlines, the source of the task (e.g., who delegated or assigned it), a description of the task, the names of people in the team associated with the task, the name of the person who originally created the task, the names of the people that have used or shared the task, and more. Metadata may also include relations between tasks that are defined by the user. Such relations might include that a certain task is a subtask of another, or that a certain task is a subtype of another task, or that a certain task is a prototype for another task, as well as other possible relations. Metadata may also include relations defined by a user between tasks and other entities. Such entities include but are not limited to resources, as defined above.

FIG. 1A shows a component-oriented view of an embodiment of the invention. The user works with a computer interface, such as a graphical user interface and input devices to generate user input 101. In the course of working, the user interacts with a number of software application programs 102 that receive input 101. These programs include but are not limited to word processing applications, spreadsheets, email programs, internet browsers, and file system browsers. Each interaction between the user and a software application is considered an event. Events may include low level events, like a mouse click or a keyboard press—and they may include more semantically meaningful events such as a file open event. A subset of all possible events is predefined for capture. This predefined subset of possible events to capture may include file opens, file saves, email compose and send, internet browser navigate, copy and paste, and window focus change. The predefined subset of events to be captured is determined based on the needs of components that will be consuming the corresponding event records, which include the Task Predictor 106 and the Adaptation Components 109. An event record 103 is generated for each captured event. Some event records may be generated that are ignored by the Task Predictor and the currently deployed Adaptation Components; these event records may be useful to Adaptation components added in the future. However, because capturing events can create a small performance overhead for the programs 102 from which they are being captured, if such events are not currently being used by the Task Predictor or Adaptation components, it is often preferable not to capture those events. For those events that are selected to be captured, when those events occur in an application, an event record 103 is generated and communicated to the Event Collector 104. In some cases, the programs 102 generate the event records, while in other cases a separate Adaptor component 111 that observes the program generates the event records.

The contents of an event record differ from event to event. Common to most event records is information indicating what time the event occurred, which application or adaptor generated the event, the version of the application or adaptor software that generated the event, and one or more resources associated with the event. For events related to user interface actions, the event record generally contains an identifier of the window where the interaction occurred if appropriate. In many cases, the event record contains an excerpt of any text associated with resources that are associated with the event. The event records may contain additional information relevant to the event, such as an indicator of which menu item was selected. Event records may also contain information that could be valuable as evidence to the Task Predictor and other learning components. For example, the outgoing links on a web page may be recorded so that the Task Predictor can learn relations between web pages.

The user is involved in multiple different activities or projects, called tasks. Tasks are units of work that are meaningful to some individual or organization that the user is affiliated with. The Event Collector 104 communicates event records to the Task Predictor 106, which then applies machine learning to predict the current task that each event is associated with. Each event record may then be associated with a task. In addition, a current task being performed may be predicted. At any point in time, the user can specify what task they are working on through a computer interface to generate a user task specification 105. They may also specify metadata about that task. This specification becomes evidence for the Task Predictor 106. In the face of no other evidence, all events that occur after the user specifies a task A are considered by the Task Predictor to be part of task A until a different task B is specified by the user. Over time the Task Predictor accumulates additional evidence and learns to predict the task based not only on the evidence of the last specified task, but also based on other features including, but not limited to: a) time since last task was specified, b) keywords in the resource (document/email/web page/etc.) that the event refers to, c) people or entities attributed in the resource that the event refers to, d) what tasks this document has been associated with before, e) observed connections between resources such as documents that are attached to emails and f) past interactive feedback from users directly specifying that the resource associated with the event is or isn't associated with a particular task or set of tasks. The Task Predictor may also use metadata about the task. For example, if the metadata describes hierarchical relationships such as sub-tasks or sub-types, the Task Predictor may use a hierarchical classification algorithm.

One detailed implementation of the Task Predictor combines a probability density estimator with a discriminative classifier. For example, a naïve Bayes model can learn the probability P(task) that the user works on each of the tasks, and it can learn the probability of the evidence P(evidence|task) that will be observed for each task. This information can be combined through probabilistic inference to determine P(evidence), which is an estimate of the degree to which the new evidence is similar to previously-observed evidence (across all tasks). If the evidence is sufficiently familiar (i.e., P(evidence) is greater than an adjustable threshold), then a learned classifier, such as a support vector machine classifier, can be applied to predict the current task. If the evidence is not sufficiently familiar, then the Task Predictor can abstain from making any prediction. The Task Predictor may combine evidence over time in making predictions, and it may make predictions after some time delay (e.g., predict that the task changed 5 minutes ago). The Task Predictor may also make its decision to abstain based on other measures of confidence such as the posterior probability of each task P(task|evidence) or the variance of the posterior probabilities over some period of time. In fitting a machine learning classifier or density estimator to the observed evidence, the learning algorithm may apply a model of user labeling error to help recover from cases where the user forgot to explicitly specify the current task (or only did so at some time after the task actually changed).

The Task Predictor 106 associates event records with tasks to produce labeled events, which are provided to Event Publisher 107. The labeled events are then communicated by Event Publisher 107 to various components that are interested, including the Event Recorder 108, the Task Indexer 113, and any Adaptation Components 109 that have registered with the Event Publisher. The distribution of event records directly from the Event Publisher to the Adaptation Components allows the Adaptation Components to receive and respond to event records quickly, rather than having to poll the Databases 114 and 115.

The Event Recorder 108 writes the labeled event records to a history Event Database 115, which is then accessible by components such as the Adaptation Components 109 that need detailed knowledge of the user's past activities.

The Task Indexer 113 receives labeled event records from the Event Publisher and updates the Task Database 114. The Task Database maintains the current beliefs of the system regarding what resources are associated with which tasks, and possibly which events are associated with which tasks. It may also maintain statistics about each task, such as the last time that a task was accessed or the number of times that a task has been accessed in the recent past.

Tables A and B show a relational database schema used in one embodiment of the invention. In this schema, events are represented by records in an event table (Table A) while much of the structure associated with individual events is kept in an XML record in the body table (Table B)—this allows easy addition of new event types or changes in the structures of individual events without changing the schema of the main event database. Also many XML tools are already designed to ignore elements of XML that they do not recognize, which helps make the invention robust to changes to structure of specific event types.

TABLE A

Event Table

| Field | Type |
| --- | --- |
| Id | Integer |
| WindowId | Integer |
| Type | Integer |
| ListenerId | Integer |
| ListenerVersion | Integer |
| BodyId | Integer |
| Time | DateTime |
| User | String |

TABLE B

Body Table

| Field | Type |
| --- | --- |
| Id | Integer |
| Type | Integer |
| Guts | XML |

The Adaptation Components 109 connect to the Event Publisher (e.g., when they start up) and register to receive event records that are valuable to them. Then they take the task-labeled event records from the Event Publisher 107 and, in response to the events, adapt one or more Software Program User Interfaces 110 in a manner that is appropriate for the task associated with the most recent event or events. User interfaces 110 will typically correspond to programs 102 that the user is interacting with. However, some programs 102 that the user is interacting with may not have their user interfaces adapted.

Adaptations of program user interfaces 110 typically fall into one of the following categories:

1. When an event record indicates that a new task has begun, the adaptive component updates user interfaces of application programs to display information related to that new task, or to provide shortcuts to resources related to that new task. For example, the preferred embodiment has an adaptive component called Task Explorer that displays a list of all the resources associated with the current task. When a task switch is detected, this display is updated.

2. When an event record indicates that the user is presented with a user interface prompting them to select from a variety of options, the adaptive components may update the user interface to display information that is both appropriate for the current task and appropriate for the user interface that the user is interacting with. For example, if the user is composing an email message and the keyboard focus changes to the "To:" entry field, an adaptive component might display a list of recipients appropriate for the current task in a menu right below the entry field. If the user begins to type, the list of recommended recipients might be filtered down to those that contain the string that has been typed.

3. When an event record indicates an event has occurred that is not the result of the most recent user interaction, user interfaces may be updated to incorporate information relevant to that event. Various forms of adaptation in response to events can be imagined where the adaptation is dependent on the current task. For example, if the event is associated with the user's current task, then adaptive components may update user interfaces to include in the user interface the resource(s) associated with the event. Or, if an email arrives the user may be notified (by an appropriate user interface) that an event has occurred that is associated with a particular task (i.e., the task predicted for the email). Also, the system may use machine learning to predict, for a new email message, a ranked list of tasks that the new email message is likely associated with.

A predefined set of appropriate adaptations for particular events are stored by the adaptive component. These adaptations may be configured by the user at runtime. Configuration may be indicating that certain adaptations should not happen, or it may include changing the details of display behavior of those adaptations (e.g., size, location, timing, font, etc).

The Adaptation Components notify the Event Publisher of what event records they would like to receive. The Adaptation Components can also access the historical data 120 including past events from the Event Database 115 and the current set of beliefs about what events and resources are associated with which tasks, stored in the Task Database 114.

The user can also view the mappings of events and resources to tasks, and can provide feedback 112 on those mappings, indicating that one or more events or resources do not belong in a task, moving one or more events or resources from one task to another, or indicating that one or more resources should be added to a task. This feedback is communicated to the Event Collector 104. Those event records propagate like all other event records to the Task Indexer 113 and the Event Recorder 114. The Task Indexer corrects its Task Database 114 in response to the user feedback. So, for example, if a user deletes the web page address "www.abc.def" from task A, then the Task Recorder will update the Task Database to reflect that the address "www.abc.def" is not associated with task A. The Task Indexer may also update its Task Database to reflect that some or all events referring to the web address "www.abc.def" are not associated with task A. The Task Database may also record and maintain the evidence that the address "www.abc.def" does not belong to task A, to discourage Task Predictor from assigning it to task A again in the future. The Tas Predictor may update its learned models to incorporate this evidence. Similar examples can be described where the user indicates that a resource should be moved from one task to another or indicates that a resource should be associated with a task.

Figure 1B:
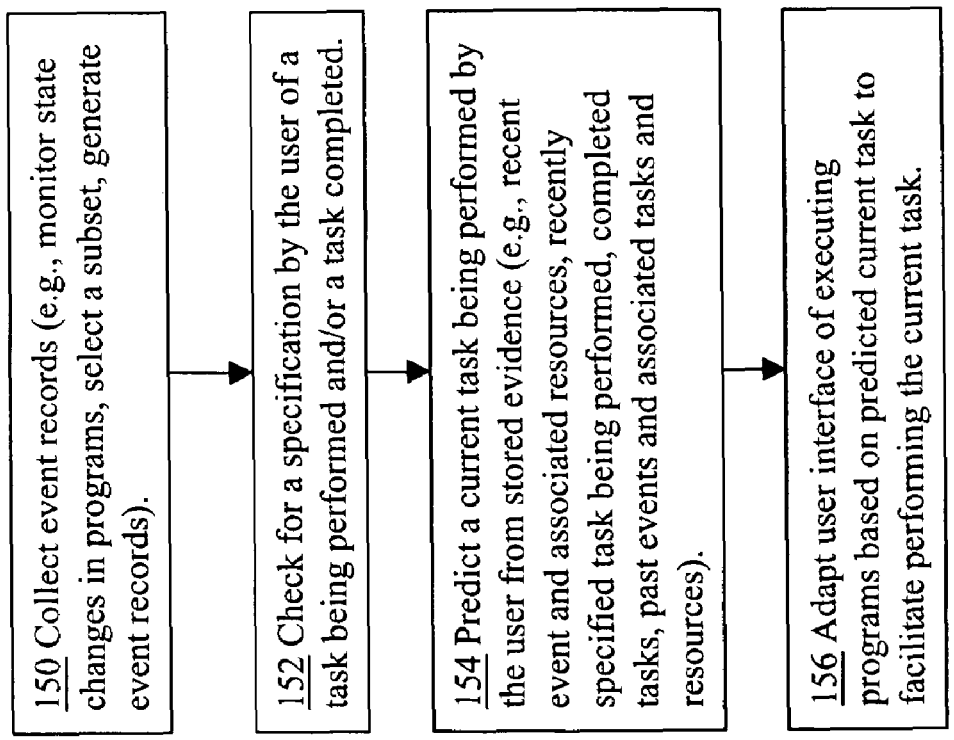
FIG. 1B shows a flowchart illustrating various steps performed in an embodiment of the invention.

FIG. 1B shows a flowchart illustrating various steps performed in an embodiment of the invention, as discussed above. In step 150 event records are collected, which may involve monitoring state changes in programs, selecting a subset of events, and generating event records. The system checks for a user specification of a task being performed and/or task completed in step 152. Based on stored evidence, the system predicts a current task being performed by the user in step 154. The evidence may include, for example, recent event(s) and associated resources, a recently specified task being performed, recently completed tasks, past events and associated tasks and resources. In step 156 the predicted current task is used to adapt one or more user interfaces of executing programs to facilitate the performance of the current task.

Figure 2:
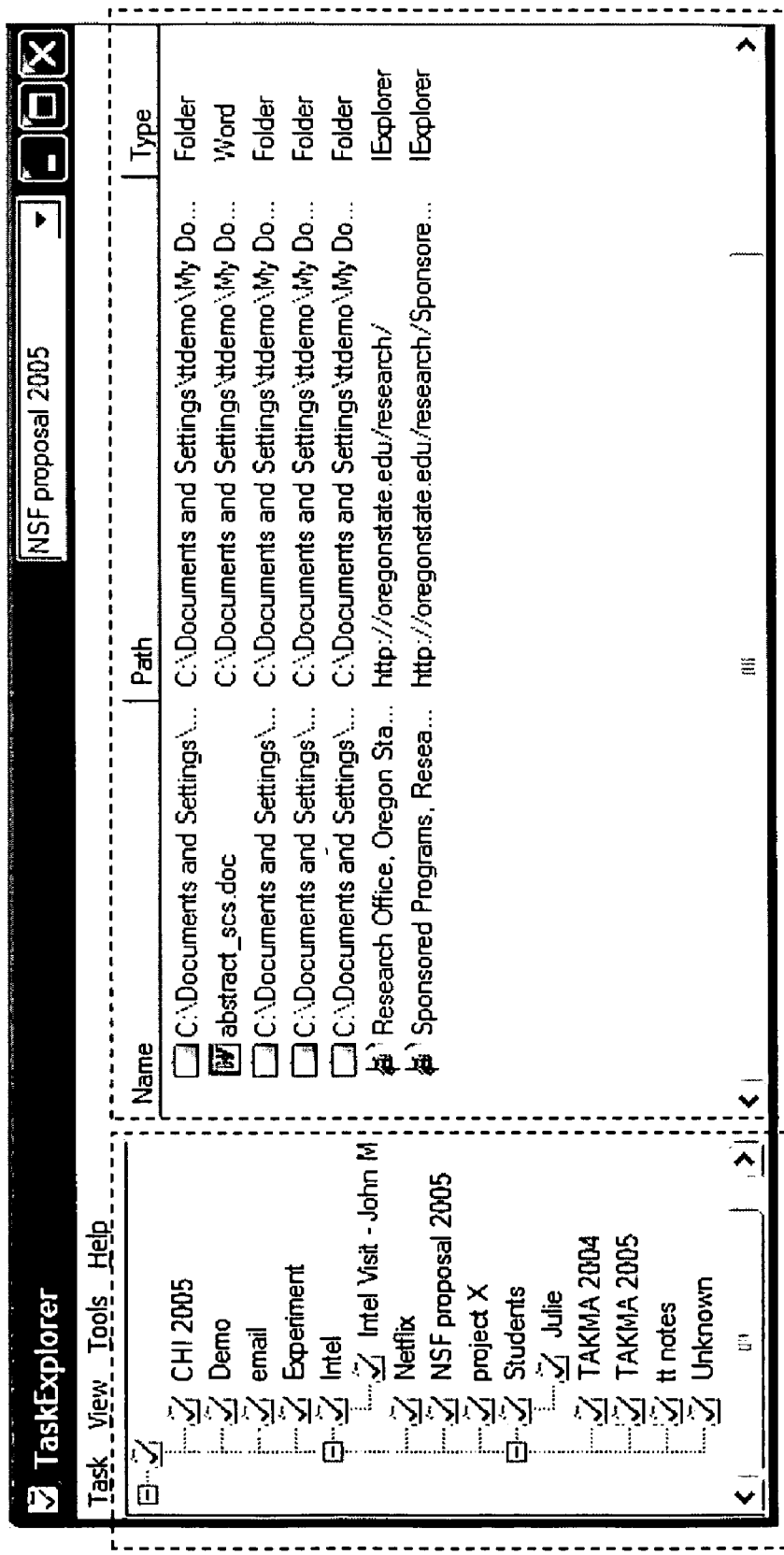
FIG. 2 depicts a user interface adapted in accordance with one embodiment of the invention to present a view of tasks and associated resources.

FIG. 2 depicts an adaptive user interface from one embodiment of the invention. The interface contains a Task View 201 which displays tasks that have been initiated by or have been assigned to the user. They may optionally be represented in a hierarchy. The meaning of the hierarchy may be left to the user, or it may be predefined by the system's builders. Examples of possible predefined meaning of the hierarchies are inheritance relationships and decomposition relationships (where a task can be broken into subtasks). The tasks in this example are sorted by the name of the top-most task in each task hierarchy; however, this list of tasks may be sorted by other attributes, such as date of last access or priority. In some embodiments, there will be a visual control that allows the user to dynamically change the view.

The user can select tasks in the Task View and then apply operations to the selected tasks. Operations include but are not limited to editing task properties, deleting a task, moving a task to another place in the task hierarchy, renaming task, creating a subtask of, or using a task as a template for the user's active task. In some embodiments, selecting a task will signal to the system that the user has just switched to working on that task.

The user may be able to mark tasks as "complete." In such a case, the user interface may support views where the completed tasks are hidden, and it may provide the means for the user to change between the view where tasks are hidden and tasks are not hidden.

The tasks displayed can represent the complete set of the users' tasks, both current and completed, or a filtered subset of all tasks can be displayed. The displayed results can be filtered by a variety of parameters, include name, modification date, priority, whether the task has been marked complete, or other metadata or statistics associated with the task.

In other embodiments of the invention, there may be a text entry box, where the user can enter text, which is then used to limit the displayed results to those tasks that contain text that is similar or exactly the same as that typed by the user.

The Resource View 202 portion of the user interface shows resources associated with the task selected in the Task View 201. There is no theoretical limit to the number of different types of resources that may appear in the Resource View pane, including documents, folders, web pages, and contacts. Resources appearing in this view are believed by the system to be part of the task selected in the Task View 201. The user can activate any one of these resources, typically by double clicking on it. When a resource is activated, the action appropriate for that resource occurs. For documents, folders, and web pages, the associated resources is opened. For contacts, an email is initiated to the recipient or a contact information page is opened.

The user may select resources from the Resource View and apply operations to them. These operations include but are not limited to delete, rename, edit properties, and move to another task.

The resources displayed can represent the complete set of the user's resources associated with a task, or a filtered subset of those resources can be displayed. The displayed results can be filtered by a variety of parameters, include name, modification date, creation date, priority, resource type, pathname, or other metadata or statistics associated with the resource In other embodiments, the resources may be displayed hierarchically, where they are grouped by some attributes, such as date (e.g., resources accessed today), type (e.g., open office writer documents), or pathname (e.g., in the directory "c:\").

Figure 3:
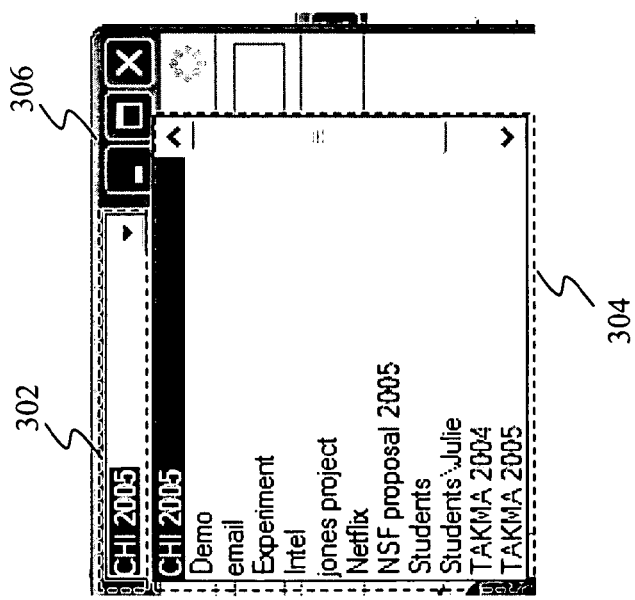
FIGS. 3 and 4 illustrate two user interfaces adapted in accordance with embodiments of the invention to allow display and user specification of a current task.

FIG. 3 illustrates a user interface adapted to allow display and user modification of a current task. In particular, a component 302 is added to the window "decoration" bar 306 that is commonly found on the top of windows in a window-based user interface. As a result, this user interface component is accessible in any major window, but does not take up potentially valuable screen real estate. This user interface displays the name of the system's belief of the user's currently active task.

When component 302 is activated by the user (e.g., by clicking on it), a dropdown list of tasks 304 may be displayed, and the user may select a new task from the list. This list of tasks may or may not be filtered. If it is filtered, it may filter out and not display tasks that are marked complete. The list may be sorted by various criteria, including last time of use and pathname. Instead of selecting a task from the drop-down box, the user may move the keyboard focus to the user interface component 302 and start typing a string of characters. This string of characters can be matched against strings that can be found in metadata about the task. In the preferred embodiment, the string of characters is matched against substrings of the existing tasks. The set of tasks against which this string of characters is matched may be filtered. One such filter is to filter out all tasks that have been marked completed. The best match will be displayed in the entry, where best may be computed in ways that are commonly used in information retrieval. If there are multiple matches to a character string that is typed in, the names of tasks from some subset of the set of matching tasks may be displayed to the user, from which they can select one. The user can then accept an auto-completed task by hitting one of a set of designated keys (such as Enter) or by changing the keyboard focus to a different window. Selecting a task from this user interface through the dropdown box or typing the name of a task informs the system that the current task has changed to the specified task. A "Task Begin" event record specifying the new current task is generated and sent to the Event Collector 104.

Figure 4:
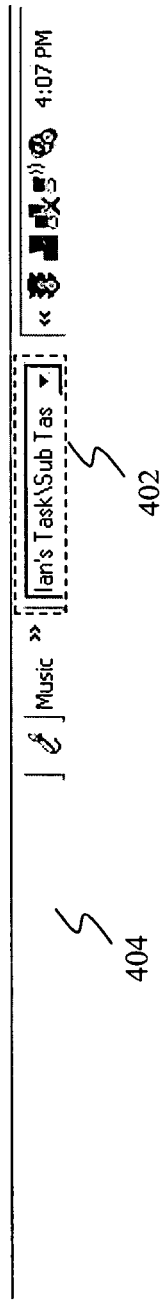

An alternative embodiment of the user interface to display the current task and specify new tasks is shown in FIG. 4. The functionality of this interface is similar to that shown in FIG. 3, except that this user interface is placed in a tool bar 404 positioned on the edge of a screen, independent of application windows, generally at the bottom edge. The tool bar 404 contains a component 402 that functions just like component 302 described above in relation to FIG. 3. The tool bar 404 may be visible at all times, or it may be configured to "auto hide", where the user must execute some interaction to cause the tool bar 404 to display, such as moving the mouse to the bottom of the screen or hitting a particular keystroke. Alternative embodiments may have additional controls for pausing or resuming data collection, or starting and stopping the software components with the invention.

Figure 5:
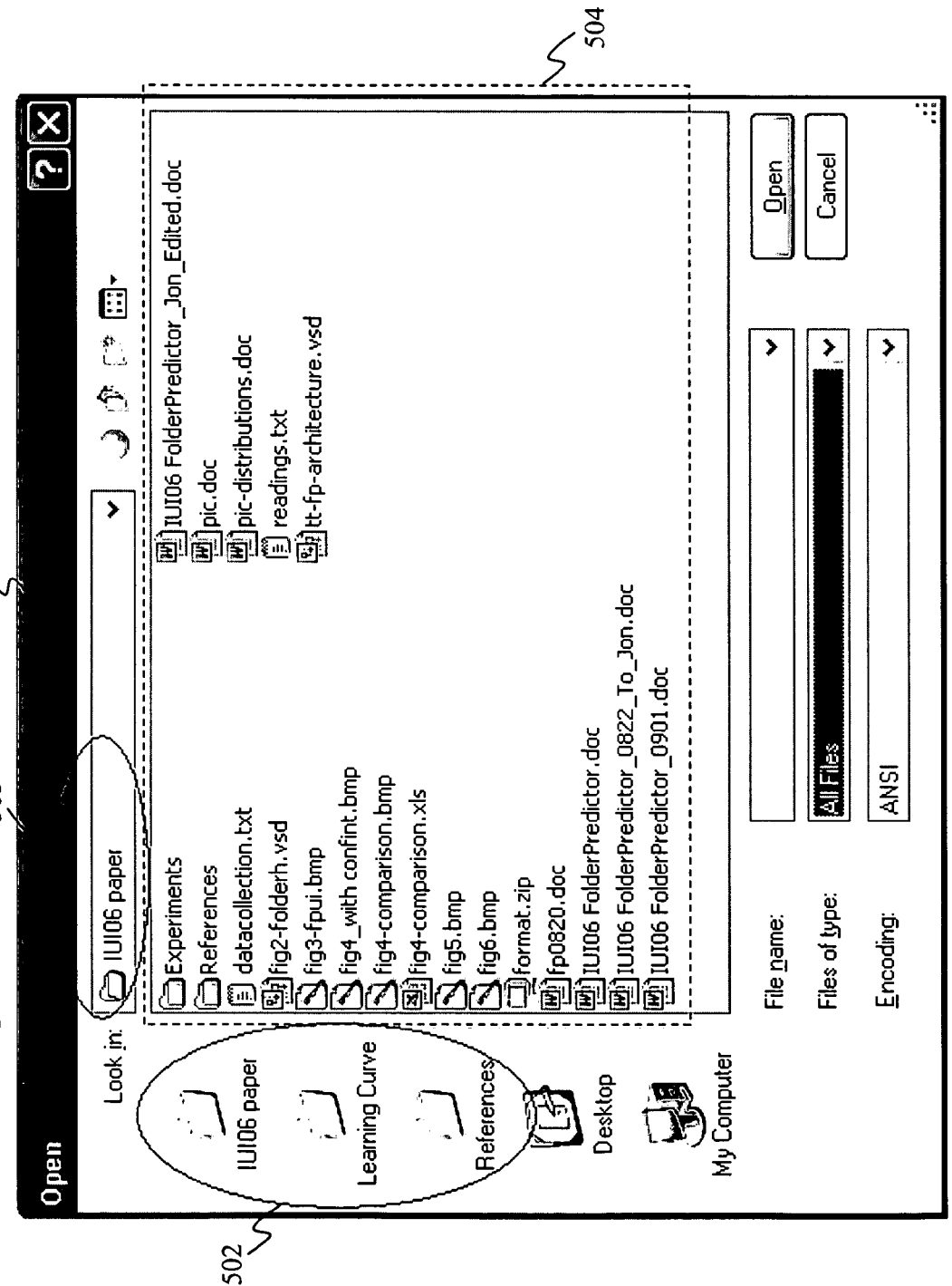
FIG. 5 shows a user interface of an underlying operating system user interface as adapted in accordance with an embodiment of the invention.

FIG. 5 shows a user interface of an underlying operating system as modified by an adaptive component. User interface window 501 is a file selection dialog box provided by the operating system. A file selection dialog box commonly opens when the user, through an interaction with the user interface, indicates that they want to select a file or a folder, such as selecting a folder to save a file in or selecting a file to open. Along the sidebar of the user interface are displayed the three most likely folders 502 that the user will want to access, as predicted by the adaptive component, assuming that the user is working on the task that the user last declared or the Task Predictor 106 predicted. These folders icons are links— if the user clicks on any of these folder icons, the current directory 503 of the user interface will be immediately changed to the folder indicated by the selected folder icon, and the contents of the directory will be displayed in main view pane 504. This adaptive interface results in substantial savings in time and frustration, since the user is often presented with the wrong folder as the default and must spend time and often many clicks to navigate to the desired folder. Furthermore, this assumes that the user actually remembers what folder they want to navigate to. The predicted folders serve as a reminder as to what good folders are for the current task, leading to less cognitive load, less frustration, and more organization. The predicted folders are possible and successful because the system is aware of the current users' task. Current applications are not aware of the user's task and thus cannot provide this functionality.

Figure 6A:
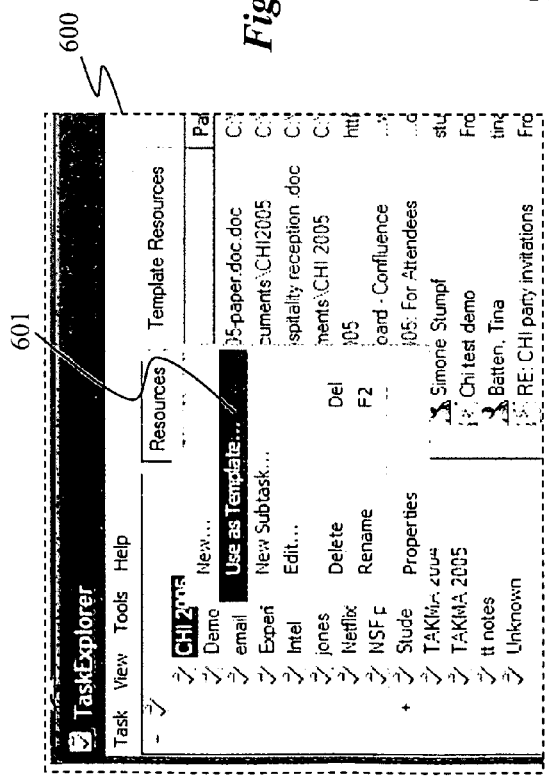
FIGS. 6A and 6B illustrate a user interface used in an embodiment of the present invention for using task templates to facilitate the repeated performance of similar or identical tasks.
Figure 6B:
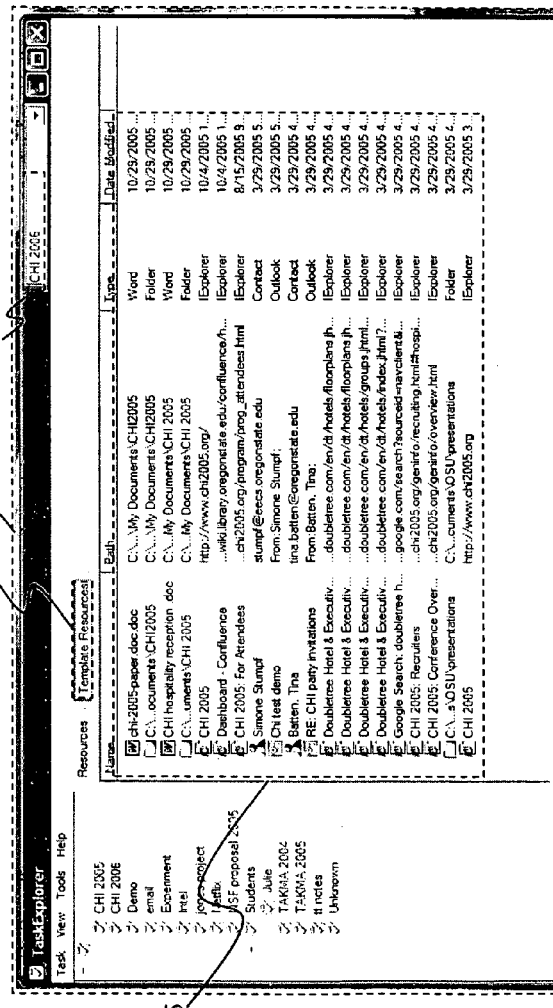

FIGS. 6A and 6B illustrate a user interface used in an embodiment of the present invention for using task templates to facilitate the repeated performance of similar or identical tasks. A process is a set of sequences of actions that can be described by a flow chart, such that when one of those sequences is performed, it is likely to achieve a goal that is desirable to the user. In some cases these processes are easy to describe, and in other cases, they are too complex to be easily represented. Each task has a process associated with it. As an example, a user may develop a "write grant proposal" process, which involves a series of actions like creating the budget, copying new salary rates from the web, emailing the budget to a contracts officer, etc. When the process is repeated, the sequence of actions may not be exactly the same—there may be some decision branches in the associated flowchart. For example, if the grant proposal involves human studies, the user must send the proposal to the institution's human subjects review board.

Developing new processes is often time consuming. Thus, once a person develops a process to achieve a goal, they can often save a substantial amount of time by reusing that process in the future, perhaps adapting it slightly to handle new circumstances, rather than redeveloping a process. The current invention provides for the capability to capture a representation of a process and provide user interfaces that allow the user to easily reuse that process for new tasks. In the current invention, the system has a record of interactions performed through the computer interface towards the completion of a task.

In one embodiment of the invention, users can specify that one task is a prototype (also sometimes referred to as a template) for another task. This is demonstrated in FIG. 6A which shows a TaskExplorer user interface 600. The user selects a task "CHI 2005" displayed in the user interface and selects the "Use as Template" operation 601 from a pop-up menu. This creates a new task that uses the task "CHI 2005" as a template. The user names this new task "CHI 2006". The resultant user interface is shown in 602 of FIG. 6B. The currently active task 603 is now the new task "CHI 2006". However, the user has selected the "Template Resources" tab 604, which displays relevant resources from the template task in the main view pane 605. The user can then access resources from the prototype task that are likely to be useful in the current task.

As an example, consider the case of organizing a conference. Every time that a conference is organized, a budget must be prepared. Designing a spreadsheet for a conference budget that has correct formulas and all the right components can be a lot of work. Therefore, a user can save a lot of time by reusing the spreadsheet from a previous year, and just updating the numbers for the new conference. Once the user has specified the previous conference organizing task as a prototype for the current conference organizing task, the user can access the budget from the previous conference organizing task without having to first switch to the old conference organizing task. This is particularly important because switching to the old conference organizing task may falsely lead the system to believe that the user is working on the old conference organizing task.

Figure 7:
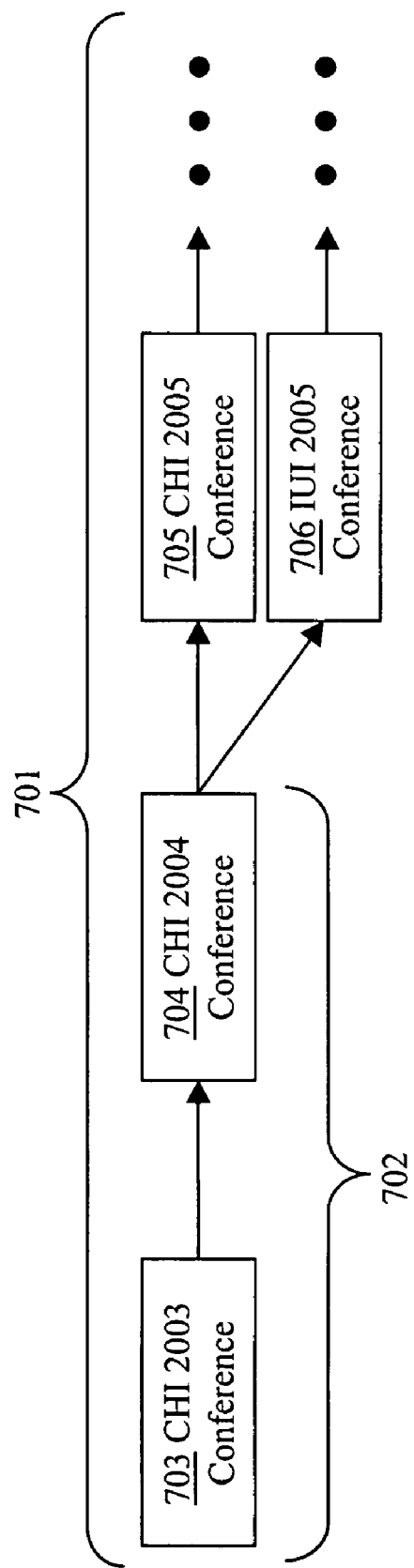
FIG. 7 represents schematically an example of relationships between task templates.

FIG. 7 represents schematically an example of how task prototype relationships might occur. Depicted is a set of tasks 701, all of which share common processes, and thus have resources that could be valuable templates for the other tasks. In this example, the user is a member of the organizing committee of the CHI conference in the year 2003 (task 703), 2004 (task 704), and 2005 (task 705). She is also a member of the organizing committee of the IUI conference in 2005 (task 706). Thus she used task 703 as a prototype for task 704, reusing resources like budgets, advertisements, and planning documents. She also used task 704 as a prototype for tasks 705 and 706. These prototype relationships are illustrated by the arrows between tasks. She could have used task 703 as the prototype, but she may have made improvements to the reused resources in task 704. If she organizes conferences in the future, she may use any of the tasks depicted as prototypes for that future conference organizing task.

In FIG. 7, we illustrated an example of how there might be a chain of tasks linked by "is a prototype for" relationships. In such a case, we might see a related chain of resources, where each resource in the chain was used as a prototype for the next resource in the chain. For example, a budget spreadsheet might be repeatedly reused, where every year the user reuses the most recently created budget as prototype. In such a situation, the invention has the ability to determine which resources on a task are likely to be used as prototypes in the future, because they have been used as prototypes before or because they are descended from prototypes and are thus potentially more updated versions of resources that were used as prototypes. This could be used to rank or filter prototype resources that are offered to the user, such as in the display 605 of FIG. 6. Furthermore, the invention can also segment the resource into subparts, such as blocks of text in a document or cells of a spreadsheet, and learn to predict what subparts of a resource are likely to change, and what the possible values for those subparts are likely to be.

Figure 8:
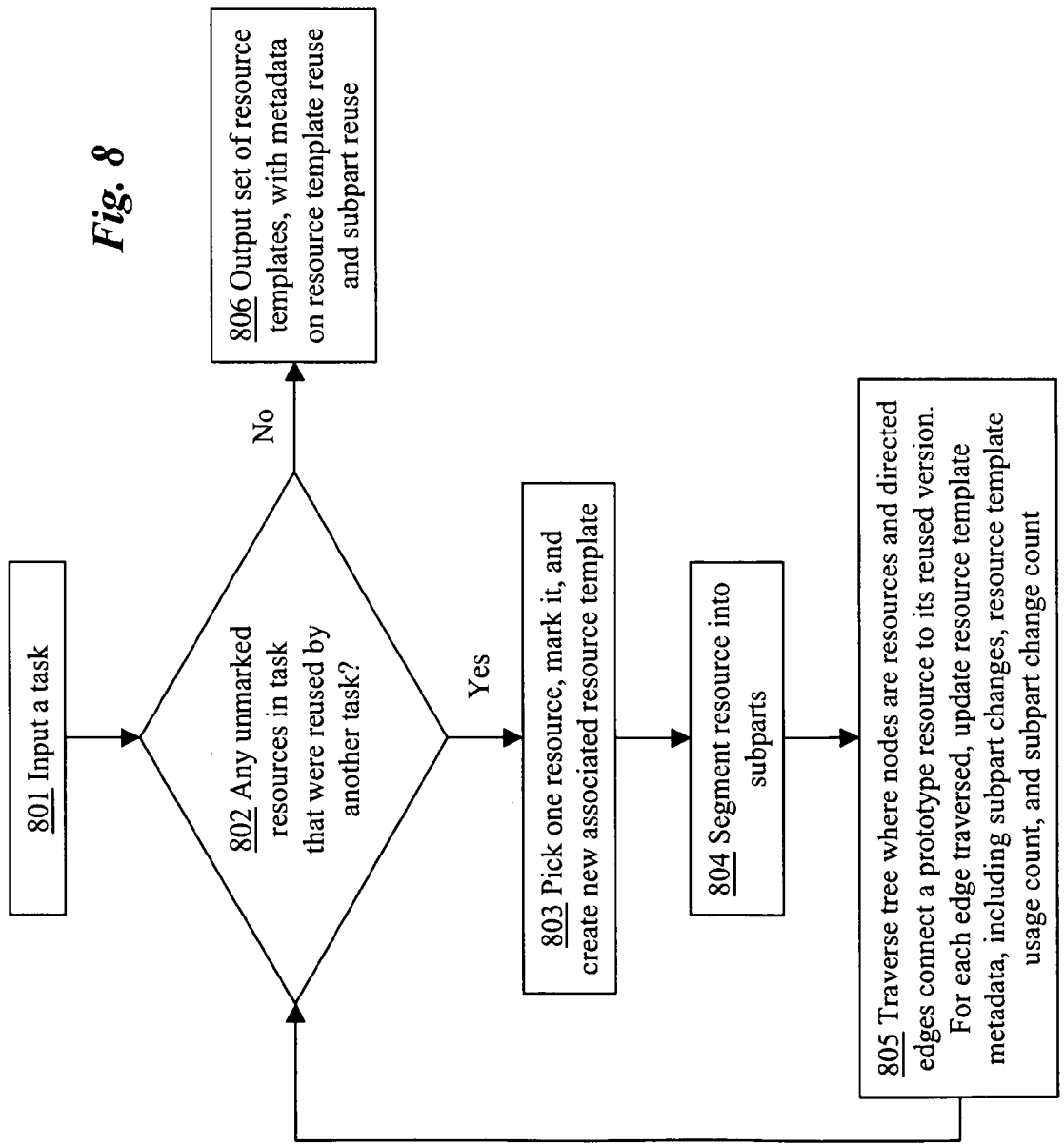
FIG. 8 is a flowchart that describes how one embodiment of the invention computes which resources are likely to be good prototypes for another task.

FIG. 8 shows a flowchart that describes how one embodiment of the invention computes which resources are likely to be good prototypes for another task, as well as which subparts are likely to change, and what possible values those subparts might change to if appropriate. In 801 a task is input into the process. A check is made in 802 to see if there are any resources in the task that were reused by another task. If there is at least one resource that was reused, that resourced is picked in 803 and a new resource template is created associated with that resource. Then the resource is segmented into subparts that are appropriate for the type of resource (e.g., blocks of text, cells in a spreadsheet) in 804. Finally, in 805 a depth-first traversal is made of the tree rooted at the selected resource, where edges describe the reuse of a prototype document, and each node describes a version of the selected resource that resulted from a reuse. These reuse edges are detected by the invention—examples include when a document is "saved-as" or otherwise copied and then modified. For each edge traversed, this embodiment updates the reuse statistics of this resource template. It also computes which subparts have changed, and it may record the differences between the changed subparts, again all stored with the resource template.

Once the entire tree rooted at the selected resource is traversed, flow returns to 802. When there are no more re-used resources that have not been marked, the system outputs the list of resource templates and their associated metadata in 806. Resource templates that were used most frequently can then be prominently recommended to the user for reuse. Furthermore, when a user chooses to reuse a resource, the system can calculate which subparts of that resource the user is likely to want to change and which subparts are likely to remain the same. Furthermore, if there are a limited number of options that have been used for a particular subpart, the system can provide a list of these options to the user, or autocomplete as the user types. An example might be travel reimbursement forms where the user must list the destination to which they traveled. The system can learn which destinations the user frequently travels to and offer to autocomplete those.

Figure 9:
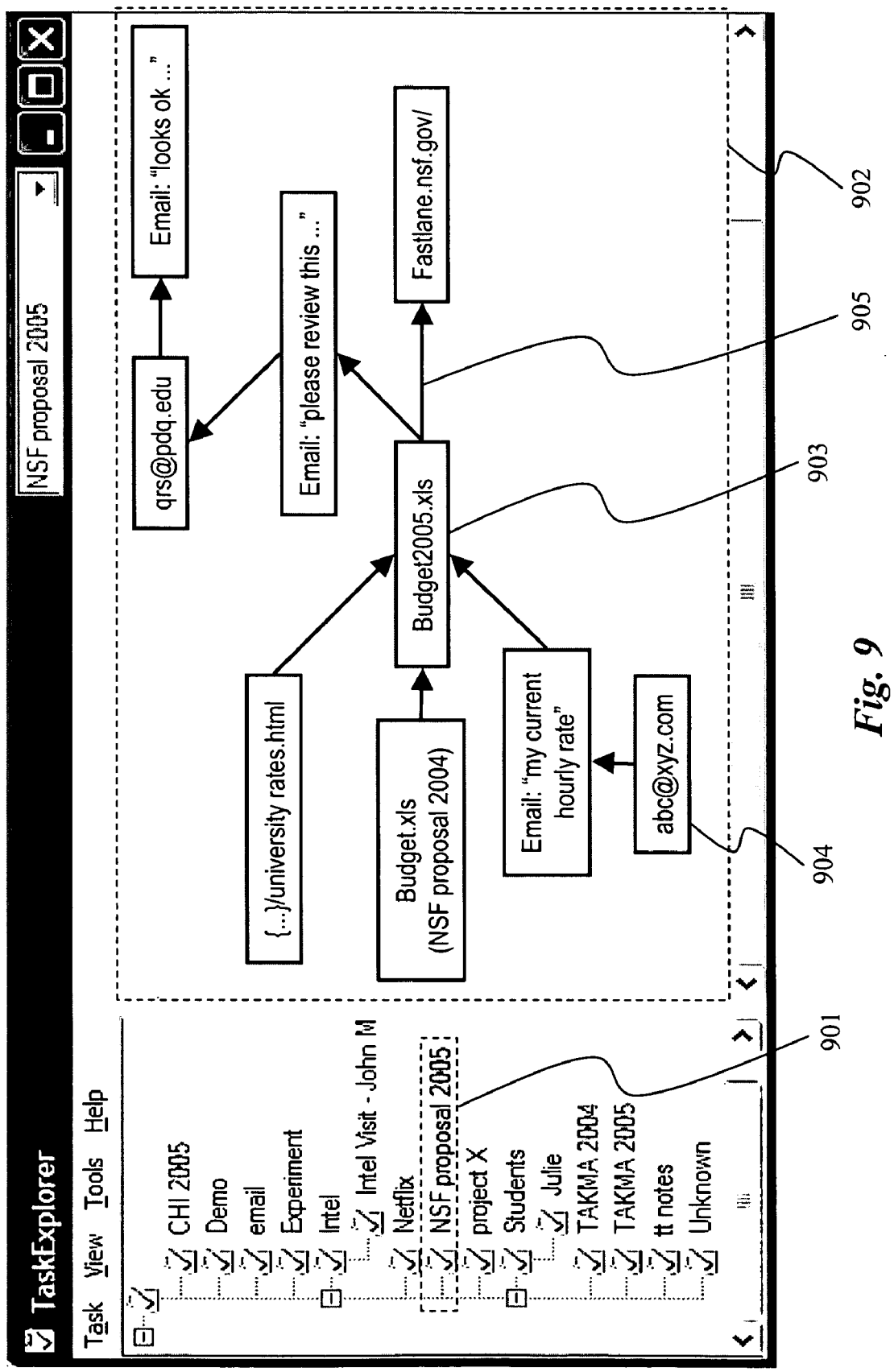
FIG. 9 illustrates an example of a user interface used to display of a data flow view of a task according to an embodiment of the invention.

Some embodiments of the invention allow a data-flow view to be produced for a task. This view can be generated from the events collected while the user is working on a task. FIG. 9 illustrates one example of an implementation of a data-flow view. The current task 901 has been selected in the left pane, and the resulting data-flow view of that task is shown in the right pane 902. The data-flow view contains icons for each resource (e.g., web page, document, email). A spreadsheet document 903 and an email address 904 are two of the resources in this example. An arrow 905 between two resources indicates that data flowed between those resources. Many different events can indicate that data has flowed between two resources. Examples include cut/copy and paste, copying a resource to a new name or location, and attaching a resource in an email to another person. Dataflow views can be very useful for the user in many ways. One example is that when resuming a task that has been interrupted for a long time, the dataflow view will help the user to quickly comprehend visually what has already been done on a task and what needs to be done. Another example is that a dataflow view of a prototype task can be a great way to communicate an overview of all the steps in a process that may need to be done. A final valuable use of dataflow view is to locate all versions and derivatives of a document.

A completed task is a valuable record of the process followed to perform a task. In addition to being of value to the user who originally performed the task, the information contained in such a task record could be of substantial value to other users as well. For example, in a research university, many professors write grant proposals which require considerable involvement of bureaucratic processes. Learning how to navigate these processes efficiently can take substantial amounts of time. Thus, if a professor has identified how to efficiently create a grant proposal and has successfully executed the process, their task is now a record of how to efficiently create a grant proposal. One aspect of the invention allows a user to share one or more of their tasks with other users by exporting task records. Users who receive the shared tasks can study the tasks to train themselves how to perform the tasks or to learn how to improve their own processes. Or they may import those tasks and use them as templates for their own tasks.

Figure 10:
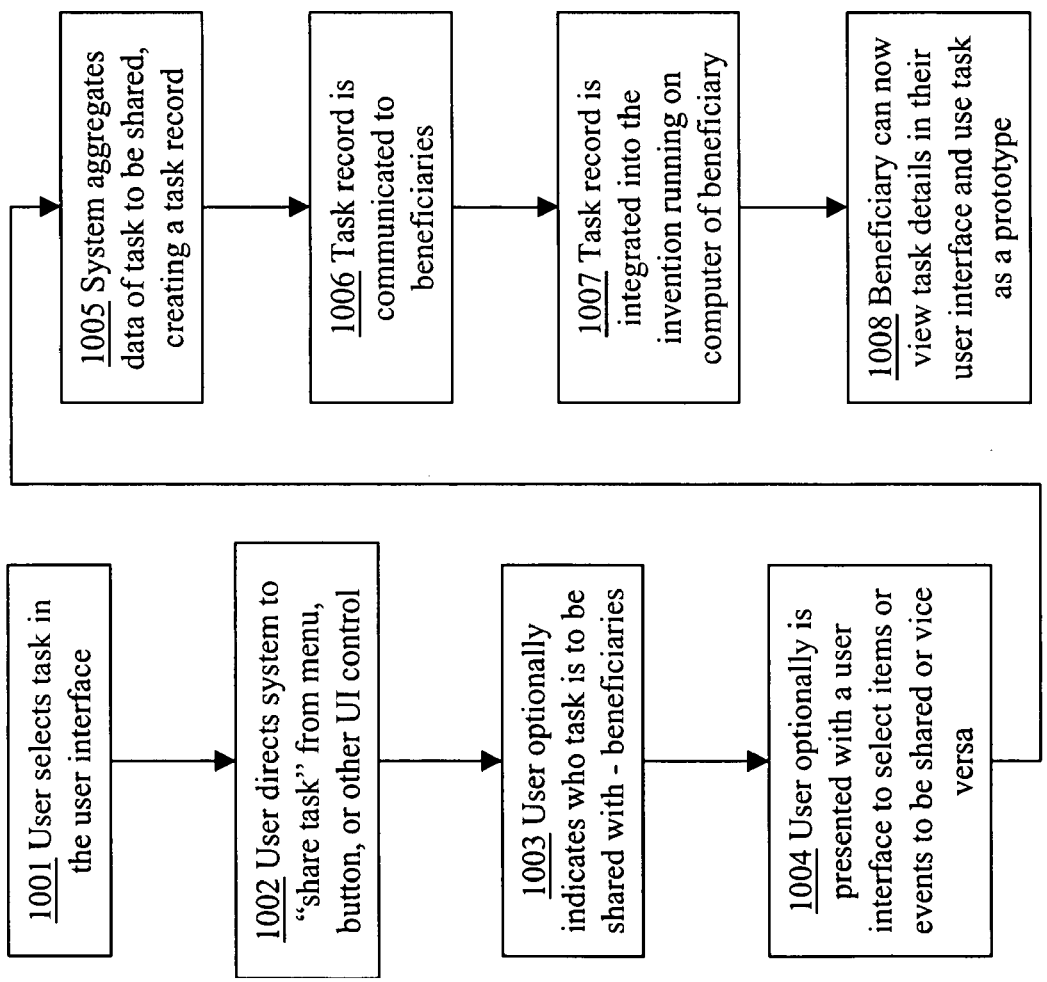
FIG. 10 illustrates the process of sharing a task according to one embodiment of the invention.

FIG. 10 illustrates the process of sharing a task in one embodiment of the invention. The user indicates at 1001 which task they want to share, perhaps using the Task View 201 of FIG. 2. Then at 1002 they indicate that they want to share the selected task, perhaps by selecting the appropriate action from a menu, similar to that displayed in 601 of FIG. 6. In 1003, the user may indicate who can receive and/or use the shared task, i.e., the task's beneficiaries. Optionally, at 1004 the user is then provided with a user interface to mark which event records or which resources accessed in the task should be shared. This allows the user to quickly verify that no incorrect or undesirable data will be shared along with the task data. The user may mark those subparts of the task they want shared or they may mark those subparts they don't want shared. When the user is done selecting the subparts to the shared, the system then aggregates all the data to be shared into a task record at 1005. This task record is then communicated at 1006 to its beneficiaries. There are many different ways to communicate task data to another user. One way is to just transfer all the event records to the beneficiaries. In this way, the beneficiaries can construct a complete view of the process of the task, but they may not have access to the complete content of resources accessed, such as the text of email messages and documents, if those resources are not on public shares. The beneficiaries will be able to see the names of resources accessed by the user, but they will have to ask the user to send them separately copies of the resources, if they want access to those resources. Another way is to send all of the event records, plus copies of all of the resources. This will ensure that beneficiaries have just as much ability to view and use a task as the user, but this could consume considerable disk space and network bandwidth. In hybrid approaches, some resources may be copied and transmitted and others may not. In some approaches, the user will be able to select in step 1004 what resources should be fully shared.

The communication of the task between users may happen through any medium for communicating digital information, such as a direct network connection, storage on and later download from a network server, or email. When the beneficiary's computer receives the task record, it is integrated at step 1007 into their Task Database 114 and Event Database 115. Then, at step 1008, the task data can be accessed by the beneficiary just as any of their own tasks, although it may be marked to indicate its origin, and not all resources may be accessible (and may be so marked in the user interface).

In some embodiments, there may be support for changing the user assigned to a task, i.e., task hand-off. In this case, a task that is in-progress by one user is handed-off to another user, e.g., by sharing the task as described above and changing the user assigned to the task. The original user then cannot specify the task, and the original user's Task Predictor will not predict that task again, unless control of the task is returned to the original user.

Figure 11:
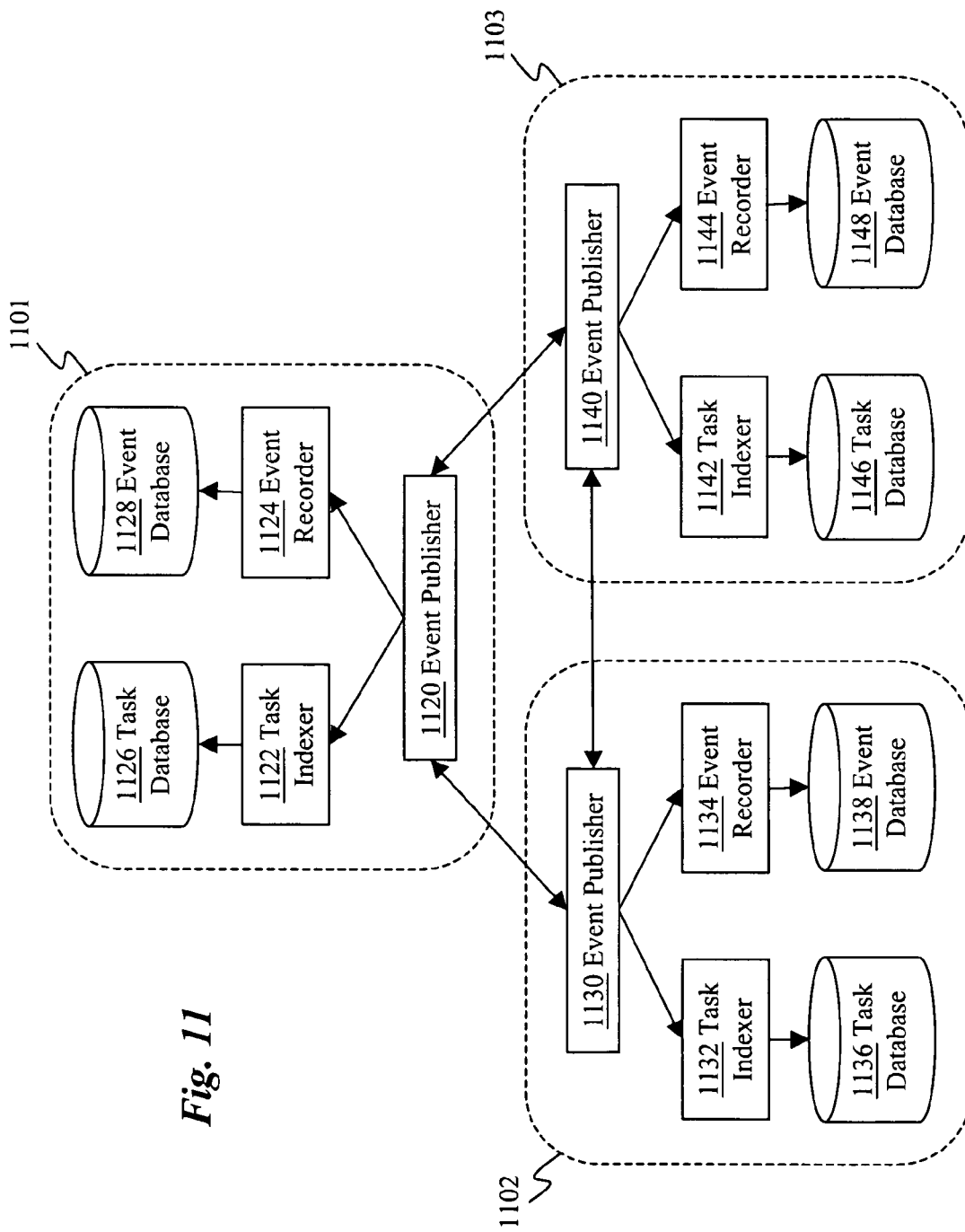
FIG. 11 is a block diagram illustrating three instances of the software running on three networked computers used by three team members sharing one or more common tasks in accordance with an embodiment of the invention.

Not all tasks are solitary. Many tasks are team tasks shared by a several people in a group, perhaps with sub-tasks assigned to individuals or smaller groups of people. Thus, some embodiments of the invention support team tasks shared among a team of people using networked computers, each running software implementing the techniques of the invention. For example, FIG. 11 illustrates a scenario in which three instances of the software 1101, 1102, 1103 are running on three networked computers used by three team members. A team task is a task that is shared among a team of people and has a commonly agreed-upon task name. When a team task is created, that task is defined in the user interfaces of all the users who are members of the team. When one of those users indicates that she is working on a team task, data about the user's activities on that task are shared, generally in real time, over the network with the other members of the team. The shared data can be any data that sufficiently describes their current activities to other members of the team. In the embodiment shown in FIG. 11, when an event occurs on a shared task on system 1101, for example, the Event Publisher 1120 broadcasts, multicasts, or individually communicates the event to the Event Publishers 1130 and 1140 on systems 1102 and 1103, respectively. Although FIG. 11, illustrates the case of a team having three members, the invention is not theoretically limited in the number of users on a team. One skilled in the art could easily see that different network communication architectures could be used, such as having a central server that aggregates and redistributes event records on a task, or different kinds of peer-to-peer architectures than are shown here. Different embodiments of the invention might filter the set of event records to reduce network bandwidth or encrypt records to increase privacy, or they might create aggregate events that summarize sets of events.

Each member of a team can get a view of what others on the team have accomplished towards a particular team task. This allows them to maintain a real-time awareness of what has and hasn't happened on a team task. They can see if somebody else is editing a resource they want to access or they can see if somebody has communicated with a particular client. A user interface such as that shown in FIG. 2 can also provide direct links to team task-related resources that have been accessed, created, or edited by others on the team.

It is significant to note that when team tasks are active, the Task Predictor running on each of the computers used by team members receives event records from all other team member computers. Thus task prediction of each user may be based on events from all users. This increased access to events should increase the capability of the Task Predictor, since the event records from the other users will increase the quantities of evidence that the Task Predictor can draw upon to make its predictions. In addition to a larger quantity of evidence, an aggregate of the data from multiple users likely provides information on more relationships between resources, since not every user will access the same set of resources, or even access resources in the same manner. For example, the Task Predictor may correctly predict the team task associated with a resource the very first time the user accesses that resource because it has observed other members of the team access that same resource when working on the team task.

In some embodiments, the mechanism for implementing team tasks as described above can be used to support transferring control of a task between members of a team. In this case, the system can be configured to allow only one person in the team to work on a task at any given time, although the events on that task will be sent to the computers of all other members of that team. The active user can then transfer control of the task to another member on the team. Once control is transferred, the original user then cannot specify that task, and the Task Predictor will not predict that task again for that user, unless control of the task is returned.

One embodiment of the invention has an aspect that tracks what are the most recently used resources in a task and, whenever the current active task changes, restores user interface elements to a prior state recorded when the user last used them. For example, the system may update the most recently used menus of the operating system (e.g., under the Start menu) and/or windows associated with resources or applications. When the user indicates that they have changed task or the system predicts that the user has changed task, the system may re-open the applications and resources that were open when the task was last worked on, it may navigate to the subparts of those resources that were most recently viewed or manipulated while working on the current project, and/or it may set the display features of the user interface windows (e.g., size and/or position) to be the same as when the application was last open on the current task. It may also hide or close applications, windows, and resources that were not open or active when the user last worked on the current task.

The invention claimed is:

1. A computer-implemented method for assisting a user performing multiple tasks in a computing environment, the method comprising:
   collecting by a computer system event records originating from multiple executing programs on the computer system, wherein each of the event records represents a state change in one of the multiple programs;
   receiving by the computer system from the user a specification of a task being performed by the user;
   predicting by the computer system a current task being performed by the user based on evidence including: i) a most recent event record, ii) a most recent specification received from the user of a task being performed by the user, and iii) past event records and associated task identifiers stored in a database; and
   adapting and displaying by the computer system executing user interface elements in multiple executing programs on the computer system based on the predicted current task;
   wherein the predicting comprises using machine learning to predict a most probable current task by combining current and recent evidence with past associations between events and tasks.

2. The method of claim 1 further comprising:
   assigning to the most recent event record a task identifier associated with the predicted current task; and
   storing the most recent event record and the task identifier in the database.

3. The method of claim 1 wherein the machine learning is a hybrid machine learning comprising applying a learned density estimator to estimate an extent to which current evidence is similar to past evidence, applying the estimate to decide whether to make a prediction, and applying a machine learning method to predict the current task.

4. The method of claim 1 wherein the collecting comprises monitoring state changes in the multiple programs, selecting a subset of the monitored state changes, and generating event records representing the selected subset.

5. The method of claim 1 wherein at least one of the events represents a state change in one of the programs resulting from user interaction.

6. The method of claim 1 wherein at least one of the events represents a state change in one of the programs resulting from automated processes.

7. The method of claim 1 wherein at least one of the events represents a state change in one of the programs resulting from network communications.

8. The method of claim 1 wherein at least one of the events represents a state change in one of the programs resulting from user feedback correcting predicted associations between tasks and resources.

9. The method of claim 1 wherein adapting executing user interface elements based on the predicted current task comprises displaying the predicted current task.

10. The method of claim 1 wherein adapting executing user interface elements based on the predicted current task comprises displaying a resource list comprising resources associated with the predicted current task.

11. The method of claim 10 wherein the resource list comprises folders.

12. The method of claim 10 wherein the resource list is ranked by a likelihood that the resources would be valuable to the user given a current task.

13. The method of claim 1 wherein adapting executing user interface elements based on the predicted current task comprises hiding user interface elements that are not associated with the current task.

14. The method of claim 1 wherein adapting executing user interface elements based on the predicted current task comprises visually emphasizing user interface elements that are associated with the current task.

15. The method of claim 1 wherein adapting executing user interface elements based on the predicted current task comprises visually de-emphasizing user interface elements that are not associated with the current task.

16. The method of claim 1 wherein the executing user interface elements comprise a menu of recently used resources.

17. The method of claim 1 wherein the executing user interface elements comprise a menu of recently used tasks.

18. The method of claim 1 further comprising displaying a data-flow view of a task selected by the user, wherein the data-flow view comprises representations of resources associated with the task and representations of movement of data between the resources.

19. The method of claim 1 further comprising receiving from the user a specification of metadata associated with the task being performed by the user.

20. The method of claim 19 wherein the metadata includes relationships between tasks.

21. The method of claim 1 further comprising receiving from the user an indication of completion of a task.

22. The method of claim 1 wherein the evidence further includes prior indications received from the user of completed tasks.

23. The method of claim 1 wherein the evidence further includes a time elapsed since the most recent specification of the task being performed by the user was received from the user.

24. The method of claim 1 wherein the evidence further includes keywords contained in a resource associated with the most recent event record.

25. The method of claim 1 wherein the evidence further includes previous tasks associated with a resource associated with the most recent event record.

26. The method of claim 1 further comprising defining a new task based on a task template derived from at least one completed task such that resources associated with the completed task are associated with the new task.

27. The method of claim 1 further comprising building a task template by analyzing a "used as a template for" hierarchy to identify resources likely to be reused and resources not likely to be be reused.

28. The method of claim 1 further comprising importing a task template derived from at least one task performed by another user.

29. The method of claim 1 further comprising exporting a task template derived from a task selected by the user.

30. The method of claim 1 further comprising assigning control of a task to another user.

31. The method of claim 1 wherein the current task is a team task and the past event records comprise event records associated with both the user and other users.

32. The method of claim 1 wherein adapting existing user interface elements comprises restoring user interface windows to a state recorded when the task was last worked on by the user.

33. The method of claim 32 wherein restoring user interface windows to the state includes opening resource windows.

34. The method of claim 33 wherein restoring user interface windows to the state includes setting a view of the opened resource windows to a subpart of the resource window that was most recently selected by the user.

35. The method of claim 33 wherein restoring the user interface windows to the state includes setting a size and position of a user interface window.

36. The method of claim 1 wherein at least one of the events represents an arrival of a new email message.

37. The method of claim 36 further comprising notifying the user if the new email is related to the current task.

38. The method of claim 36 further comprising using machine learning to predict, for a new email message, a ranked list of tasks that the new email message is likely associated with.

39. The method of claim 38 wherein Bayesian networks are used in the computational model of the machine learning.

40. The method of claim 1 further comprising sharing a task with another user.

41. A computer-implemented method for assisting a user performing multiple tasks in a computing environment, the method comprising:
   collecting by a computer system event records originating from multiple executing programs on the computer system, wherein each of the event records represents a state change in one of the multiple programs;
   receiving by the computer system from the user a specification of a task being performed by the user;
   predicting by the computer system a current task being performed by the user based on evidence including: i) a most recent event record, ii) a most recent specification received from the user of a task being performed by the user, and iii) past event records and associated task identifiers stored in a database; and
   adapting and displaying by the computer system executing user interface elements in multiple executing programs on the computer system based on the predicted current task;
   wherein the evidence further includes explicit instructions from the user to associate a specified resource with a specified task.

42. A computer system comprising:
   a computer interface comprising input devices generating user input from interactions of a user with multiple executing programs on the computer system;
   an event collector that collects event records originating from the multiple executing programs on the computer system, wherein each of the event records represents a state change in one of the multiple executing programs;
   a task predictor that predicts a current task being performed by the user based on evidence including: i) a most recent event record, ii) a most recent specification received from the user of a task being performed by the user, and iii) past event records and associated task identifiers stored in a database; and an adaptation component that adapts executing user interface elements in the multiple executing programs based on the predicted current task such that the user interface elements assist the user in navigating to resources associated with the predicted current task;

wherein the task predictor uses machine learning to predict a most probable current task by combining current and recent evidence with past associations between events and tasks;

wherein the computer interface comprises a display that displays the adapted executing user interface elements to the user to assist the user in performing multiple tasks on the computer system.

* * * * *